5 Sheets—Sheet 1.
A. SCHNABEL & T. HENNING,
Assignors, by mesne assignments, to THE INTERLOCKING SWITCH AND SIGNAL COMPANY.
Railway Switch and Signal Apparatus.
No. 9,693. Reissued May 3, 1881.
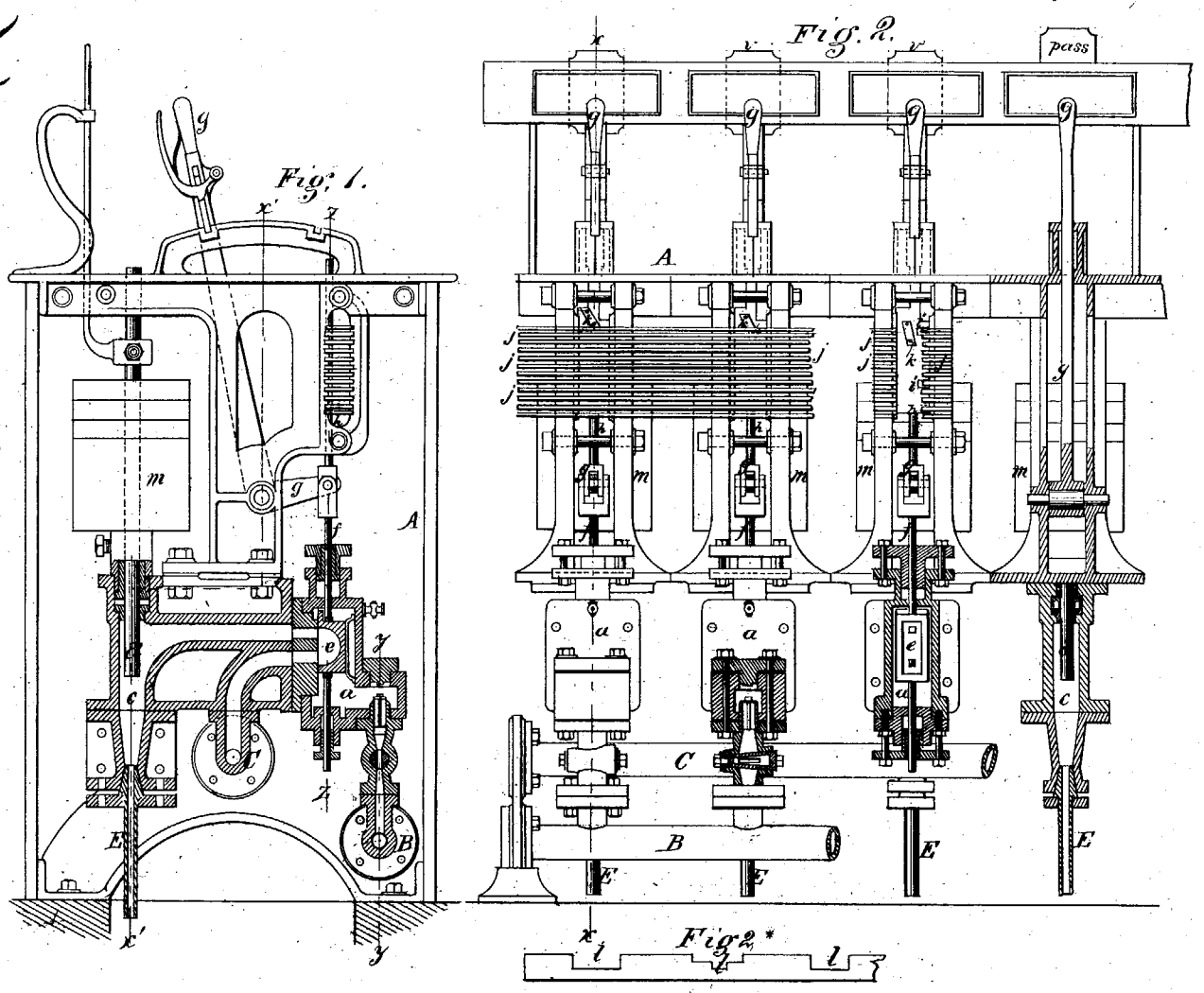
Witnesses
C. L. Parker
R. H. Whittlesey
Inventors
By Attorney
Adolph Schnabel,
Theodor Henning,
George H. Christy

A. SCHNABEL & T. HENNING,
Assignors, by mesne assignments, to THE INTERLOCKING SWITCH AND SIGNAL COMPANY.
Railway Switch and Signal Apparatus.
No. 9,693. Reissued May 3, 1881.
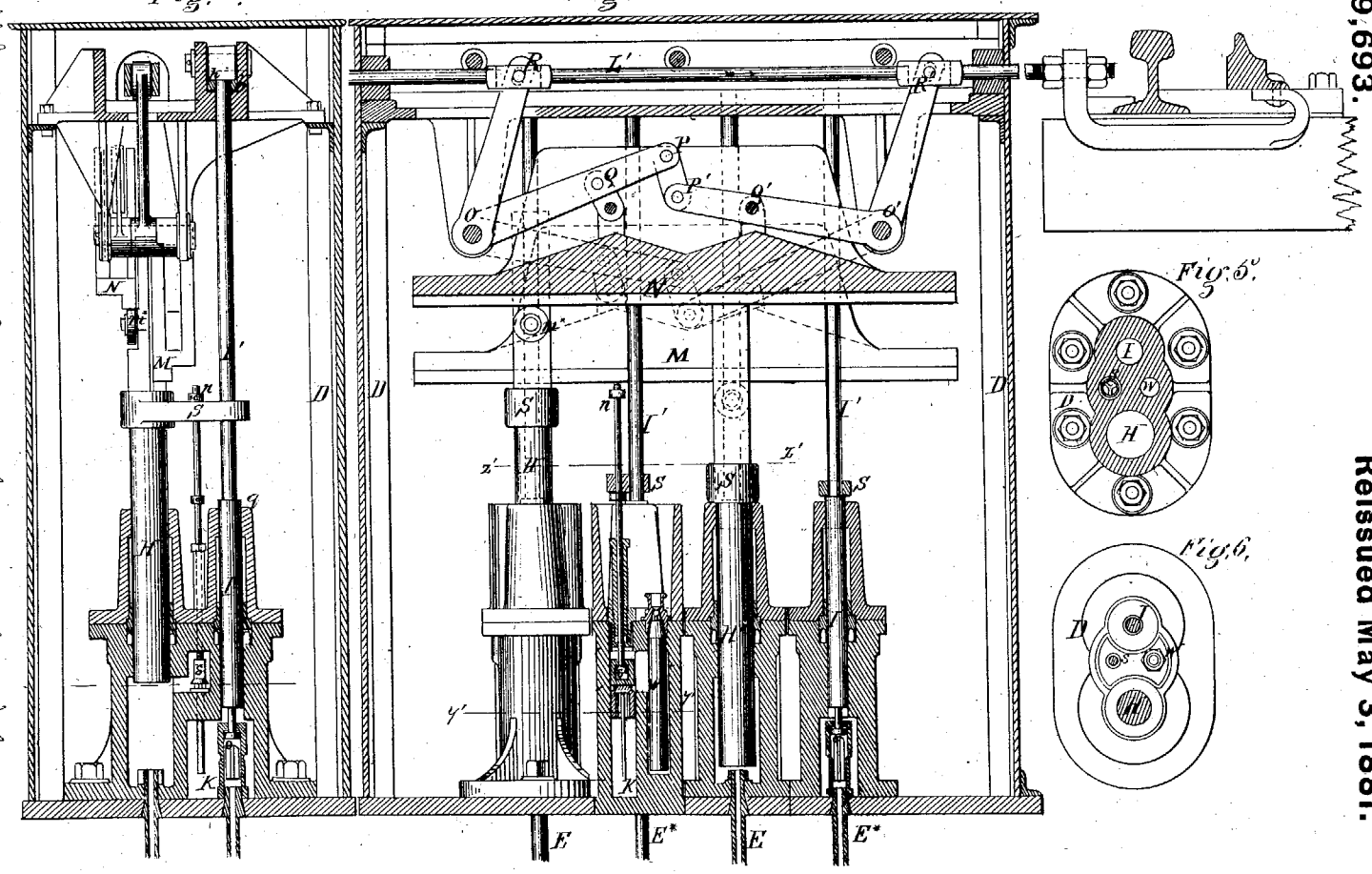
Witnesses.
C. L. Parker
R. H. Mattesey
Inventors Adolph Schnabel
Theodor Henning
By Attorney George H. Christy

A. SCHNABEL & T. HENNING,

Assignors, by mesne assignments, to THE INTERLOCKING SWITCH AND SIGNAL COMPANY.

Railway Switch and Signal Apparatus.

No. 9,693. Reissued May 3, 1881.

Witnesses
C. L. Parker
R. H. Whittlesey

Inventors
By Attorney
Adolph Schnabel
Theodor Henning
George H. Christy

A. SCHNABEL & T. HENNING,

Assignors, by mesne assignments, to THE INTERLOCKING SWITCH AND SIGNAL COMPANY.

Railway Switch and Signal Apparatus.

No. 9,693. Reissued May 3, 1881.

Witnesses
E. L. Parker
R. H. Whittlesey

Inventors
Adolph Schnabel
Theodor Henning
By Attorney George H. Christy

5 Sheets—Sheet 5.

A. SCHNABEL & T. HENNING,

Assignors, by mesne assignments, to THE INTERLOCKING SWITCH AND SIGNAL COMPANY.

Railway Switch and Signal Apparatus.

No. 9,693. Reissued May 3, 1881.

Witnesses.
C. L. Parker
R. H. Whittlesey

Inventors.
Adolph Schnabel
Theodor Henning
By Attorney George H. Christy

UNITED STATES PATENT OFFICE.

ADOLPH SCHNABEL AND THEODOR HENNING, OF BRUCHSAL, BADEN, GERMANY, ASSIGNORS, BY MESNE ASSIGNMENTS, TO THE INTERLOCKING SWITCH AND SIGNAL COMPANY, OF HARRISBURG, PA.

RAILWAY-SWITCH AND SIGNAL APPARATUS.

SPECIFICATION forming part of Reissued Letters Patent No. 9,693, dated May 3, 1881.

Original No. 111,261, dated January 24, 1871. Application for reissue filed March 29, 1881. Patented in England, No. 215 of 1870; in Austria, No. 1,320 of 1870; in France, No. 91,784 of 1870; and in Belgium, No. 27,011 of 1870.

*To all whom it may concern:*

Be it known that we, ADOLPH SCHNABEL and THEODOR HENNING, of Bruchsal, in the Grand Duchy of Baden, Germany, have invented a new and useful Improvement in Railroad-Switches and Signal Apparatus; and we do hereby declare the following to be a full, clear, and exact description thereof, which will enable those skilled in the art to make and use the same, reference being had to the accompanying drawings, forming part of this specification, in which drawings—

Figure 1:
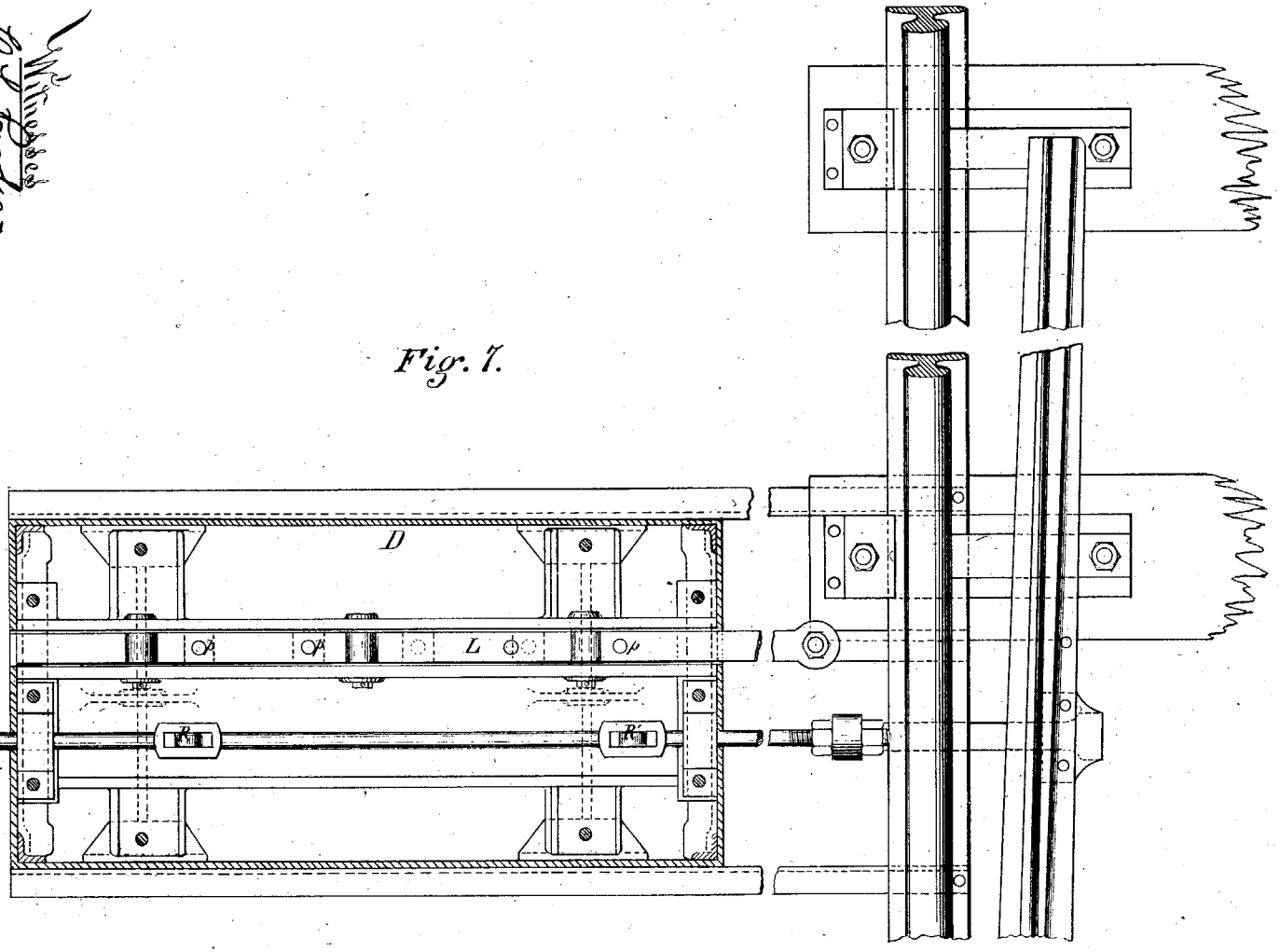
Figure 8:
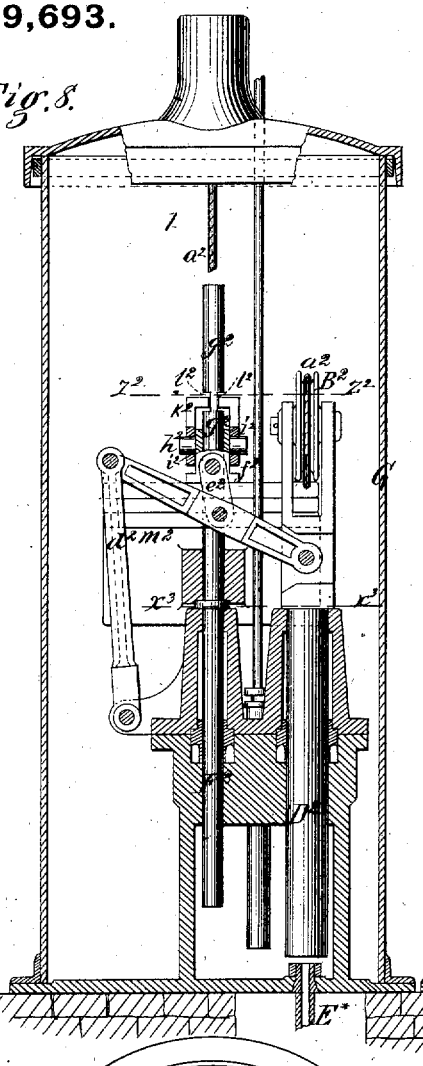
Figure 9:
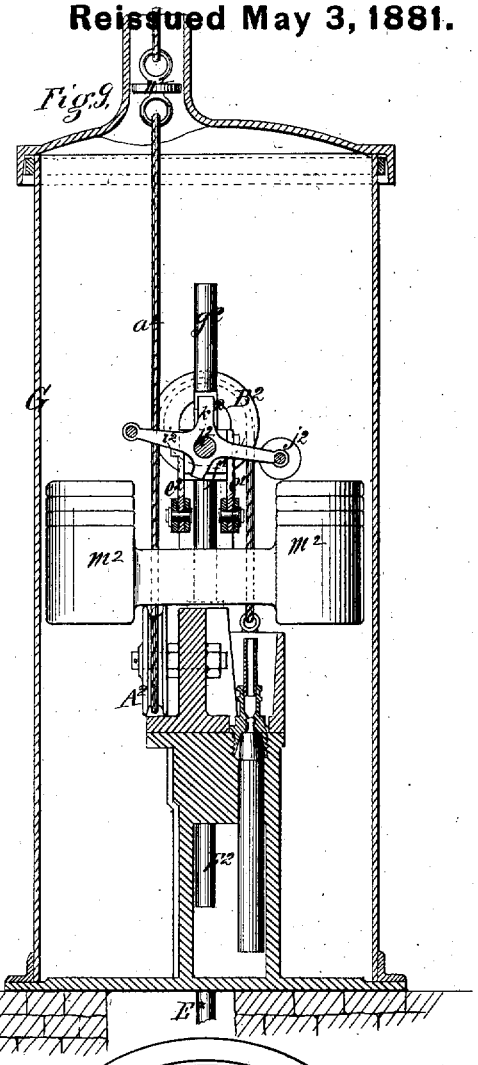
Figure 10:
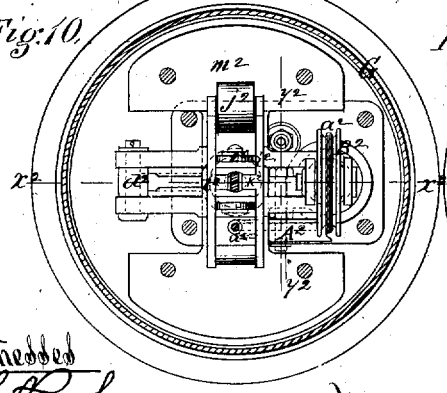
Figure 11:
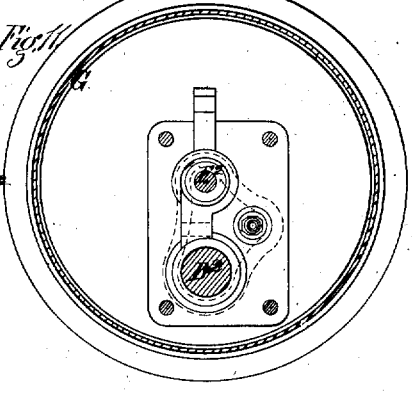
Figure 1:
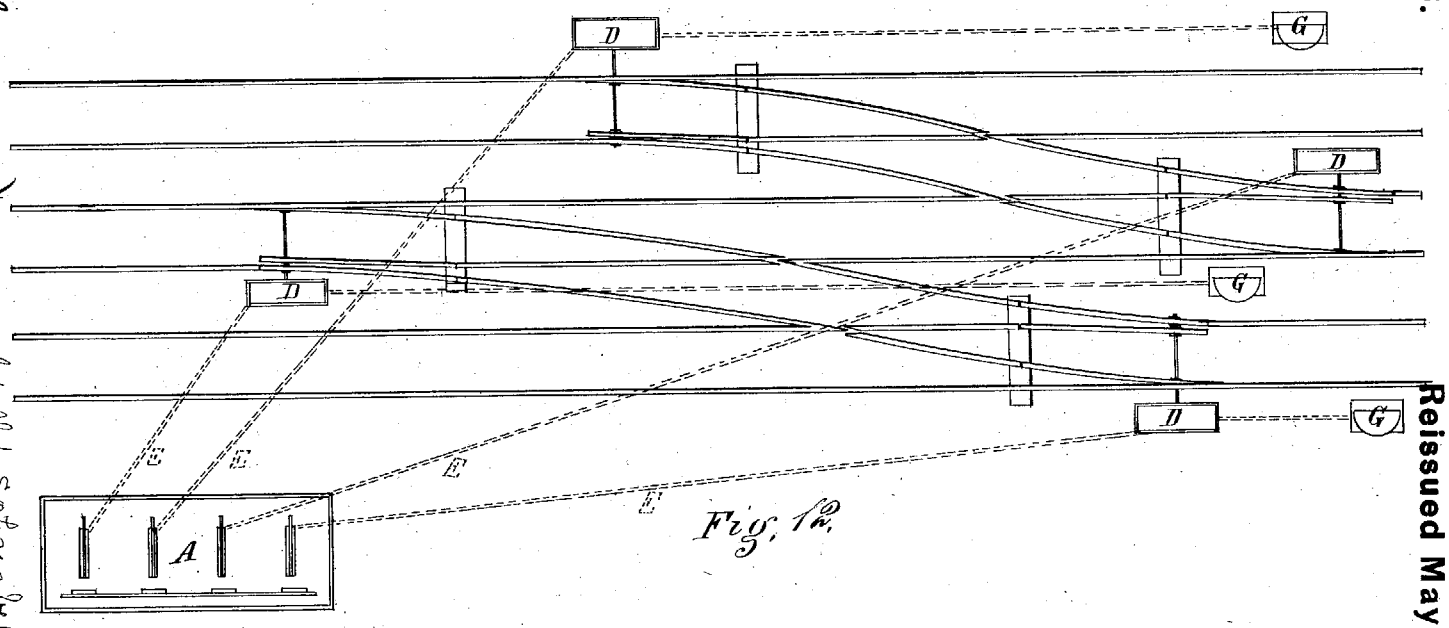

Figure 1 represents a transverse vertical section of the central apparatus, which serves to control the current of the water in its flow to the various switches, the plane of section being indicated by the line $x\ x$, Fig. 2. Fig. 2 is a sectional front view of the same, the lines $y\ y$, $z\ z$, and $x'\ x'$ indicating the various planes of sections, as will be hereinafter more fully explained. Fig. 3 is a transverse section of a local apparatus, which receives its motion from the central apparatus and transmits the same directly to the switch. Fig. 4 is a sectional front view of the same. Fig. 5 is a horizontal section of the same, the line $y'\ y'$, Fig. 4, indicating the plane of section. Fig. 6 is a similar section of the same in the plane $z'\ z'$. Fig. 7 is a plan or top view of the same. Fig. 8 is a vertical section of the signal apparatus, which connects with the local apparatus and serves to indicate to the engineer that the various switches which he has to pass are in the correct position. The line $x^2\ x^2$, Fig. 10, indicates the plane of section. Fig. 9 is a similar section of the same, taken in the plane $y^2\ y^2$, Fig. 10. Fig. 10 is a horizontal section of the same, taken in the plane of $z^2\ z^2$, Fig. 8. Fig. 11 is a similar section of the same, taken in the plane $x^3\ x^3$, Fig. 8. Fig. 12 is a diagram showing the general arrangement of the invention in a railroad-depot.

Similar letters indicate corresponding parts.

This invention relates to an apparatus whereby the various switches and appropriate signals in railroad-depots are set correctly all from one point or central apparatus, so that the safety of the travel is not dependent upon the attention of the switch-tender; and, furthermore, one operator is enabled to attend to all the switches in the depot without being compelled to leave his post.

Our system of apparatus is made dependent for its operation upon hydraulic pressure, the flow of the water to the various apparatuses controlling the position of the several switches being governed by a series of valves in the central apparatus, each of said valves controlling the motion of a distinct switch or series of switches belonging to the route of a certain train—that is to say if a train, in passing in or out of a depot, has to travel over two or more switches, the local apparatuses controlling these switches are connected with each other, and the flow of water to all of them is governed by one and the same valve in the central apparatus.

With the local apparatus or apparatuses of each route is connected a signal apparatus, situated at a convenient distance from the first switch to be passed by an approaching train, so that the engineer can see in time if all the switches which he has to pass are in the correct position. The valve-rods of the central apparatus are provided with locking-slides, so that two interfering switches can never be moved simultaneously; and these locking-slides are so constructed and arranged that, being actuated from the valve-moving lever, they will be caused to interlock or engage with each other in advance of the opening of the ports by which an operative hydraulic pressure is admitted to the pipes leading to the switch-actuating mechanism. The local apparatus or apparatuses and signal apparatus belonging to one and the same route are connected together, so that the signal cannot be raised unless all the switches in the route have previously been correctly adjusted.

With the signal apparatus is also connected a control-signal, situated in the central apparatus, so that by the position of said control-signal the operator of the central apparatus is enabled to ascertain if all the switches of a route are in the correct position. Each local apparatus is provided with a locking-bar, so that the several switches are firmly locked while the trains pass over them. At the same time, after the signal is drawn in, each switch can be moved by hand in the ordinary manner, if desired.

In the drawings, Figs. 1 and 2, the letter A designates the central apparatus, which contains a series of valve-chambers, *a*, one for each particular route in the depot. Each of these valve-chambers communicates with a pipe, B, which connects with a hydraulic pump, or with any other apparatus containing water under pressure, and the bottom of each of said valve-chambers is perforated with two ports, *b b**, (see Fig. 1,) the port *b* leading to a cylinder, *c*, which contains a plunger, *d*, while the port *b** leads to the exhaust-pipe C.

Over the ports *b b** is placed the slide-valve *e*, which connects, by a rod, *f*, with a hand-lever, *g*. If this hand-lever is brought in the position shown in Fig. 1, the cylinder *c* is cut off from the supply-pipe B and brought in communication with the exhaust-pipe C; but by moving the hand-lever in the direction of the arrow marked near it in Fig. 1 the port *b* is thrown in communication with the supply-pipe B, the port *b** remaining closed, and the water passes through the cylinder *c* and the pipe E to the local apparatus D. (Shown in Figs. 3, 4, 5, and 6.)

Before proceeding with the description of the local apparatus, it must be remarked that the central apparatus, A, contains a series of valve-chambers, *a*, and cylinders *c*, one for each local apparatus, four such valve-chambers and cylinders being shown in Fig. 2, one in front view, the next as a section in the plane *y y*, Fig. 1, the third as a section in the plane *z z*, Fig. 1, and the fourth as a section in the plane *x′ x′*, Fig. 1.

From the valve-rods *f* extend prolongations *h*, which are provided with notches *i*, and across these prolongations are placed a series of slides, *j*, to which a transverse motion is imparted by oblique cam-pieces *k*, attached to the prolongations *h*, and acting on the edges of notches *l* in the slides. (See Fig. 2*.) These notches are so shaped that each valve-rod, on being depressed, imparts motion to one or more of the slides, and the slides so moved engage with the notches *i* in one or more of the prolongations *h* of other valve-rods, so that if one of the valve-rods is depressed all the other valve-rods which control the motion of interfering switches will be locked, and consequently no switch can be moved which would allow the passage of a train liable to come in collision with that train for which the switches are actually to be adjusted.

It will also be observed that the different cam-pieces *k* may, on the different prolongations *h*, have different degrees of obliquity with reference to varying the rapidity or length of motion of the slides which are engaged thereby, and also that they may, on the different prolongations *h*, be arranged at different points in the vertical length of the prolongations with reference to causing them to act on different slides, in the manner and for the purposes herein stated.

In Fig. 2* we have shown a plan view of one of the slides. The notches in these slides are of unequal length, some of the notches being so long that their edges will not engage with the corresponding valve-rod when the slide is moved, and one of the notches being provided with a recess for the corresponding cam-piece *k*.

The plunger *d* of the cylinder *c* is loaded by a weight, *m*, and the area of its transverse section is so proportioned that said plunger is not raised on the first admission of the water, but the water admitted to the cylinder *c* passes through the pipe E to the appropriate local apparatus D, as above set forth. This local apparatus consists, chiefly, of a plunger, H, which is raised by the pressure of the water flowing in through the pipe E, and which serves to set the switch. For this purpose the elongation of said plunger is provided with a roller, *m**, which strikes a rod, N, that connects, by levers O P, O R, O′ P′, O′ R′, with a slide, L′, which is attached to the switch-rail. This lever-connection between the rod N and slide L′ is similar to that of an ordinary platform-scale, said rod being suspended from pivots Q Q′ at such points in the levers O P O′ P′ that the proportion is as follows: O′ P′ : Q′ P′ :: O P : Q P; and consequently it makes no difference at which point the roller *m** of the plunger H strikes the rod N for the purpose of raising the same up. The levers P′ O′ and R′ O′ are connected at their hubs in the manner of a clutch, so that when the rod N is raised the lever P′ O′ will force the lever R′ O′ in the position shown in Fig. 4; but if the rod N sinks down, the lever R′ O′ will remain in this position. The levers R O and P O are not connected at all, so that the lever O R simply moves with the slide L′. By raising the rod N, therefore, the slide L′ is moved out in the direction of the arrow marked thereon in Fig. 4, and the switch-tongue is carried in the same direction. If desired, the levers R O P O may be dispensed with. With this same switch-tongue connects a second local apparatus, the plunger H* of which acts on a rod, M, which connects with the slide L′ by levers arranged like those of the rod N, but in the reverse direction, so that by their action the motion of the slide L′ and of the switch-rail is reversed. This action of this second local apparatus, however, is controlled by a slide-valve in the central apparatus different from that which controls the first local apparatus, each slide-valve being intended to set the various switches for one train only, or for one and the same route. When the plunger H has been raised to the top end of its stroke an arm, S, which is secured on its elongation, strikes a collar, *n*, fastened on the upper part of a rod which extends from the valve *s*, and this valve is opened. The water is thereby admitted to the space K, and it raises the plunger I, which carries a valve, *o*, covering the pipe E×, through which the water passes on to the next local apparatus, or to the signal apparatus, as will be hereinafter more fully explained.

From the plunger I extends a rod, I′, which passes freely through the arm S, and which extends close under a slide, L, running parallel to the slide L′. (See Figs. 3 and 7.) This slide L connects with the switch-rail, and it is provided with a hole, *p*, which passes over the rod I′ as soon as the switch-tongue is brought up close to the required position. The plunger I, therefore, is not permitted to rise until the switch has been properly adjusted, and as soon as the rod I′ penetrates the slide L the switch is firmly locked. After the train has passed the switch the connection with the exhaust-pipe C is opened in the central apparatus, A, and the plunger H is depressed by the weight of the rod N, which is made sufficiently heavy for this purpose. When the plunger H approaches the lowest point of its stroke the arm S strikes the shoulder *q* of the plunger I and depresses the same to its original position, and thereby unlocks the movable rails of the switch. In the meantime the switch remains in position, and it can be moved, in the ordinary manner, by hand, if it is necessary or desirable.

The entire apparatus is inclosed in a box of sheet metal or other suitable material, and it is sunk in level with the ground. The top of the box is made removable, so that it can be taken off for the purpose of getting access to the working parts. To prevent freezing the box may be made with double walls filled in with a bad conductor of heat.

The water used in the apparatus is freed from air by means of a float, W, which is placed in a well between the cylinders containing the plungers H I, and connecting with the same. On the top of this float is a valve, and if the well is filled with water free from air the float rises and closes the valve; but if, in the course of time, such air which may be contained in the water becomes disengaged, it accumulates in the top of the well, and as the well in this case cannot be filled up with water the float W sinks down and its valve is opened, so as to allow the air contained in the top of the well to escape. As soon as the air is out the well fills up with water, the float rises, and the valve is closed.

If a route contains two or more switches, each switch is operated by a distinct local apparatus; but all the local apparatus appertaining to the same route are situated in the same circuit of pipes, which is controlled by one slide-valve in the central apparatus. The last local apparatus in the circuit connects by means of the pipe E* with the signal apparatus G, which is shown in Figs. 8, 9, 10, and 11, and which is situated at some distance from the switch in the direction in which the train approaches. This apparatus is inclosed in a box and let down level with the ground under the signal, with which it connects by a rope or chain, $a^2$, the signal itself not being shown in the drawings. Said apparatus consists, principally, of two plungers, $D^2$ and $F^2$, and the water which passes in through the pipe E* forces up the plunger $D^2$. The rope $a^2$ extends through under a pulley, $A^2$, which is mounted on a pin secured in a bracket attached to one of the cylinders; thence over a pulley, $B^2$, which is mounted in the forked prolongation of the plunger $D^2$, and then down to a loop or ring secured to the cylinder of the plunger $D^2$. If the plunger $D^2$ rises, therefore, the rope or chain is drawn in for double the distance traveled over by said plunger. At the same time the plunger $F^2$ is also raised, as follows:

From the prolongation of the plunger $D^2$ extend two levers, one on each side, each being pivoted at its outer end to a rocking-bar, $d^2$, while it connects at or near the middle of its length by a link, $e^2$, with a sleeve, $f^2$, which slides up and down on the rod $g^2$, extending from the plunger $F^2$. From the sides of the sleeve $f^2$ project gudgeons $h^2$, which support a rocking frame, $i^2$, one end of which is loaded with a weight, $j^2$, while the other straddles the rope or chain $a^2$. From this rocking frame extend two hooks, $k^2$, and if the weight $j^2$ is allowed to sink down these hooks engage with notches $l^2$ in the plunger-rod $g^2$. (See Fig. 8.) To this plunger-rod is also secured a heavy weight, $m^2$. When the plunger $D^2$ rises the hooks $k^2$ carry up the plunger $F^2$ until a disk, $n^2$, Fig. 9, which is secured to the rope or chain $a^2$, comes in contact with the rocking frame $i^2$, and by tilting the same on its gudgeons throws the hooks $k^2$ out of the notches $l^2$. This operation takes place after the signal has been set, and then the plunger $F^2$ is depressed by the weight $m^2$. By the pressure of the plunger $F^2$ the water contained in the signal apparatus is forced back through the pipes E* E into the central apparatus, and since it is prevented by a check-valve from returning to the supply-pipe B, said water acts upon the plunger *d* in the central apparatus. From this plunger extends a rod, *u*, which carries the control-signal *v*, and as the plunger $F^2$ descends, after the several switches and the signal of the route have been set for the passage of a train, the control-signal is raised by the action of the plunger *d*, showing to the operator of the central apparatus that everything is right. It is obvious that in order to effect this purpose the superficial pressure exerted by the plunger $F^2$ must be greater than that of the plunger *d*. After the train has passed the hand-lever of the central apparatus is returned to the position shown in Fig. 1, and the water is thereby allowed to discharge.

It will also be observed that the valve *e*, by the motion of which hydraulic pressure is turned on and off, has a considerable length of lap in its upper foot, or in the foot which covers the port *b*, so as alternately to bring said port into communication with the supply and with the waste, and that in turning on or applying pressure, as described, the valve *e* must, before the port *b* is opened to the supply or head under pressure, travel so far as, by the action of the corresponding cam-piece *k*, to shift one or more of the slides *j* into a partial locking engagement with one or more of the prolongations *h* of other valve-rods by partially entering the notch or notches *i* made therein, and that such partial engagement or interlocking will, of necessity, lock securely in position the corresponding valve-rods, and through them the valve-levers, in advance of the applying or turning on of hydraulic pressure to shift or move the switch. Hence we effect in the manner described what in other kinds of interlocking switch and signal mechanism was and still is known as "preliminary" interlocking, and the distinctive feature of which is, in the present invention, the partial engagement of the interlocking devices in advance of the opening of the port by which hydraulic pressure is transmitted to the switch and signal actuating mechanism; and we believe ourselves to be the first to incorporate preliminary interlocking into the construction and operation of a hydraulic switch and signal apparatus of any kind.

From this description it will be seen that our apparatus has the following chief advantages: First, the signal for a train to pass cannot be set until all the switches for said train have been properly adjusted; second, it is never possible to give simultaneously the signal to pass for two trains the routes of which cross each other; third, the proper adjustment of the switches and signals to pass is indicated in the central apparatus by the control-signal; fourth, during the motion of a train all the switches belonging to it are firmly locked, but as soon as the signal to pass is drawn in said switches are unlocked and can be set by hand, if desired; fifth, our apparatus acts with safety for the distance of three thousand yards; and, sixth, we attain in a hydraulic apparatus preliminary interlocking, or the engagement of the interlocking parts or devices in advance of the application of hydraulic pressure to the switch or signal actuating mechanism.

We claim herein as our invention—

1. In an apparatus for actuating railway switches and signals by hydraulic pressure, a series of valves for applying and releasing the pressure, and an interlocking apparatus for locking other valves on the movement of one, in combination with each other and with a hand-lever having connections with the valve and with the interlocking apparatus to be moved, whereby both shall be moved simultaneously, substantially as set forth.

2. A hydraulic interlocking switch and signal apparatus, having in combination a series of levers, each moving a valve and interlocking slides, a hydraulic pipe for supplying fluid under pressure, a pipe for conveying the fluid-pressure to the local apparatus, and a switch-actuating plunger at such local apparatus, substantially as set forth.

3. In hydraulic signal and switch apparatus, a switch-actuating plunger and a signal-actuating plunger arranged on the same line of hydraulic communication, in combination with an interposed valve actuated by the switch-plunger movement, substantially as set forth, whereby on the completion of the switch movement the signal movement will be effected by the further transmission of the same force.

4. In combination with a hydraulic switch-actuating mechanism, a locking-bolt for locking the switch and a hydraulic plunger for operating the bolt, substantially as set forth.

5. In a hydraulic interlocking switch and signal apparatus having an operating-lever, a valve, and supply and waste ports governed thereby, a locking mechanism taking its motion from the operating-lever, and arranged to be brought into an interlocking engagement in advance of the opening of the supply-port, substantially as set forth.

6. A series of recessed locking-slides, *j*, in combination with the valve-rods of the central apparatus, substantially as described, whereby the movement of one valve shall lock other valves and their operating-levers, and so prevent the switches of interfering trains from being set simultaneously.

7. The locking-slide L, connected with the movable rails of the switch, in combination with plunger I, locking-rod I′, and plunger H, substantially as set forth.

8. The combination of the switch-actuating plunger H and signal-actuating plunger $D^2$, and a hydraulic connection from the cylinder of the one to the cylinder of the other, substantially as set forth.

9. The combination of the switch-actuating plunger H, the signal-actuating plunger $D^2$, the loaded plunger $F^2$, and the control-signal plunger, *d*, substantially as set forth.

In testimony whereof we have hereunto signed our names to this specification in the presence of two subscribing witnesses.

ADOLPH SCHNABEL.
THEODOR HENNING.

Witnesses:
MATHIAS HÖCKLIN,
AUGUST MEISTER.